Aug. 7, 1951 S. A. DOMACK ET AL 2,563,320
MACHINE FOR MIXING BOTTLED BEVERAGES
Filed Sept. 9, 1948 3 Sheets-Sheet 3
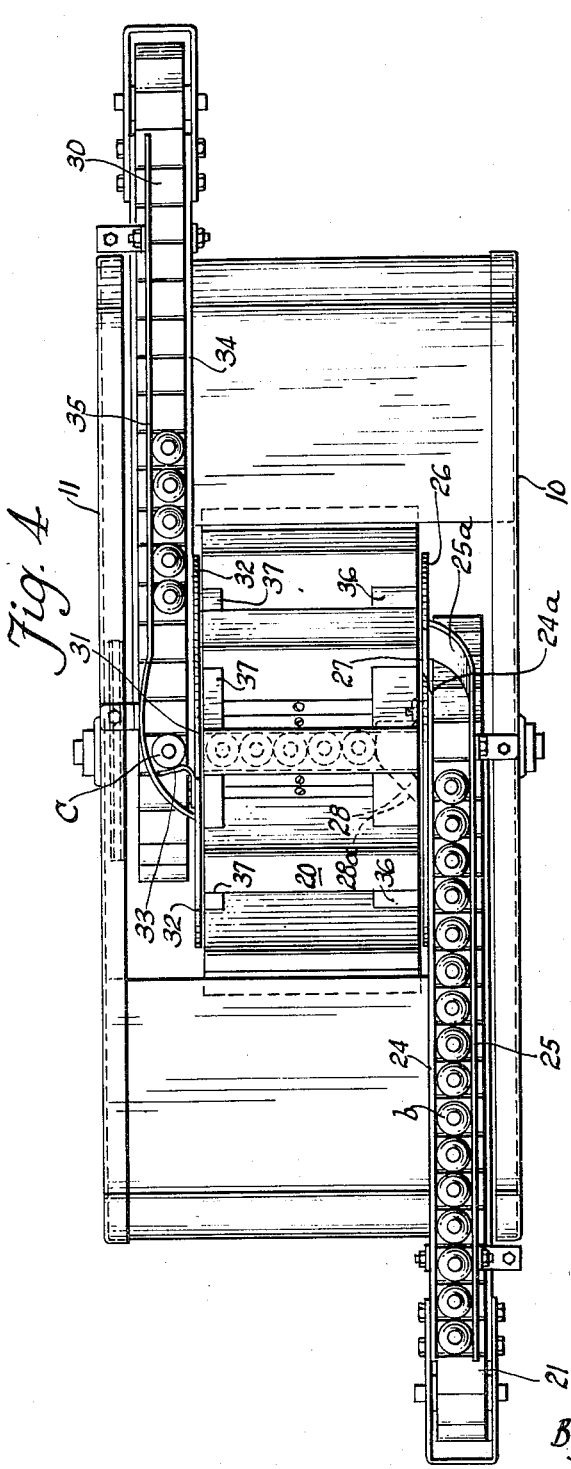
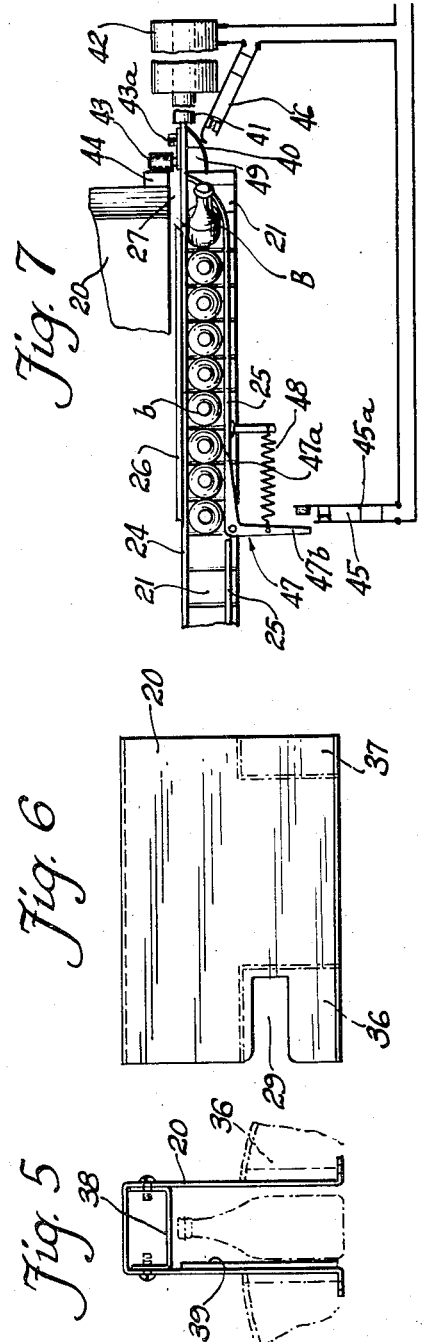
INVENTORS.
Stanley A. Domack
and John Rutkowski
By Sheridan, Davis & Cargill
Attys Patented Aug. 7, 1951

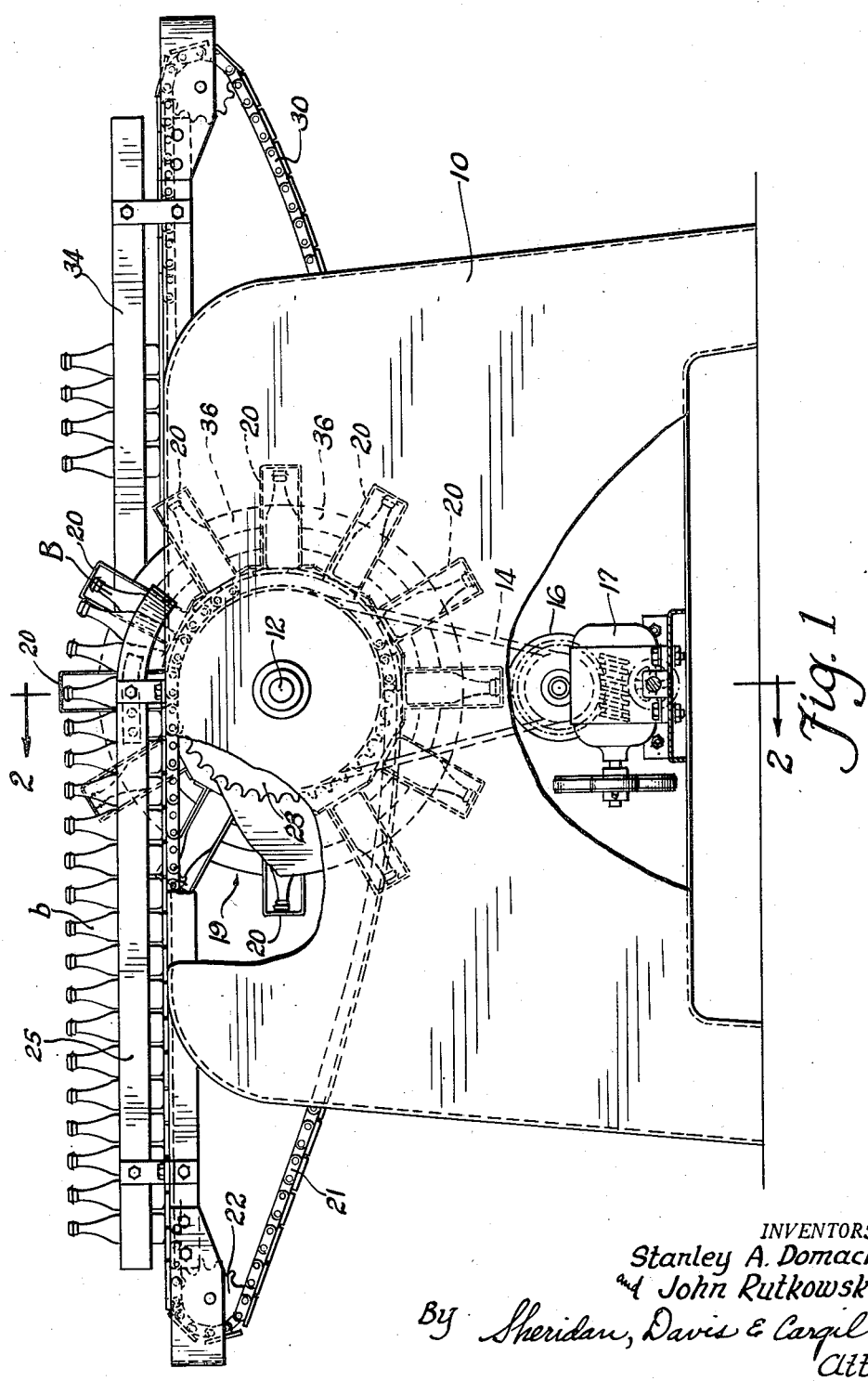

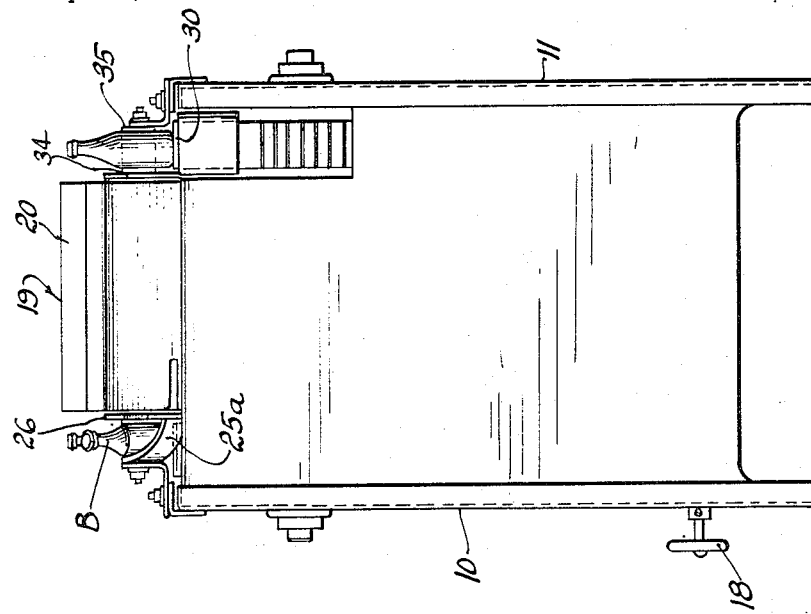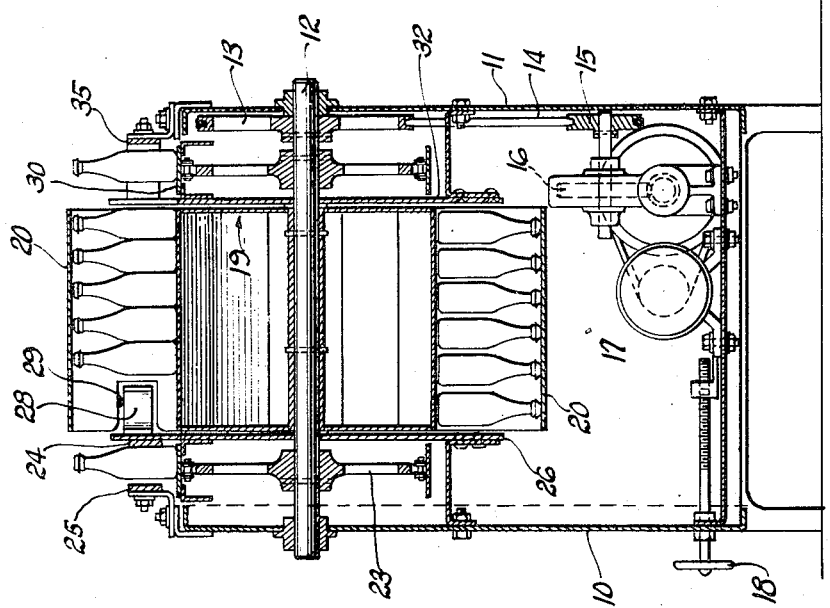

2,563,320

UNITED STATES PATENT OFFICE 2,563,320

MACHINE FOR MIXING BOTTLED BEVERAGES

Stanley A. Domack and John Rutkowski, Oshkosh, Wis., assignors to Keenline Equipment Corporation, Oshkosh, Wis., a corporation of Wisconsin Application September 9, 1948, Serial No. 48,416

5 Claims. (Cl. 259—54)

This invention relates to improvements in machines for mixing bottled beverages.

Following the filling and capping of bottles of soft drinks, it is the general practice to agitate the bottles to cause the syrups to mix with the carbonated water. So called mixing machines have been developed that agitate the bottles after they have been packed in cases or cartons but the present improvements relate to machines that effect the mixing prior to packing.

One object of the invention is to provide an improved machine that effects the feeding of the capped bottles into a continuously rotating agitating rotor structure by a combination of inertial and gravitational forces, thereby eliminating the use of a feeding cam or equivalent device for shifting the bottles from a feeding station into the rotor and providing a high capacity machine that operates more smoothly and with less noise and with less likelihood of cracking the bottles.

Another object of the invention is to provide a bottle mixing machine having a rotor provided with a plurality of longitudinally arranged cells or pockets each adapted to carry a plurality of bottles during operation and means for shifting the bottles in each cell one step, or the width of one bottle toward the exit end during each rotation of the rotor for the purpose of expelling one bottle from each cell onto an outlet conveyor during each rotation for making room for the entrance of one bottle into each cell from a delivery or feed conveyor, thereby providing a continuously operating self-loading and self-unloading mechanism.

An additional object of the invention is to provide means for a mixing machine for timing the movement of a bottle through an entrance passage with the angular movement of a bottle receiving cell for insuring complete movement of the bottle into the cell and thereby avoiding jamming of the machine and possible breakage of the bottle.

Other objects of the invention relate to various features of construction and arrangement of parts which will be apparent from a consideration of the following specification and accompanying drawings, wherein:

Figure 1 is a broken side elevational view of a machine that is illustrative of the present invention;

Fig. 2 is a sectional view taken on line 2—2 of Fig. 1;

Fig. 3 is an end elevational view of the machine;

Fig. 4 is a top plan view of the machine;

Fig. 5 is an enlarged broken end elevational view of one of the several bottle cells carried by the rotor;

Fig. 6 is a side elevational view of the cell shown in Fig. 5; and

Fig. 7 is a diagrammatic view of a bottle control apparatus for preventing the movement of bottles from the bottle feeding position to the cells except in synchronization with the movements of the cells.

In the drawing, the machine illustrated is provided with a suitable supporting frame including two opposed side walls 10 and 11 extending between which is a driven shaft 12. The shaft is driven by any suitable means illustrative of which is a belt pulley 13 mounted on the shaft adjacent the wall 12, a belt 14, pulley 15, the latter of which, by conventional speed reducer mechanism 16 is driven by an electric motor 17. Conventional variable speed drive means is provided, adjustable by a hand wheel 18 for varying the rate of rotation of the shaft 12.

Upon the shaft is mounted a rotor indicated generally by the numeral 19, the peripheral surface of which is provided with a plurality of bottle carrying cells 20 which extend longitudinally of the rotor. Each cell 20 preferably is formed of sheet metal secured to the periphery of the rotor by any appropriate means and each is open at the opposed ends. The length of each cell and thus the length of the rotor preferably is not less than six times the diameter of the largest diameter bottles to be handled by the machine whereby the mixing cycle will consist of not less than six passages of each bottle about the rotor as the latter rotates. Six revolutions of a bottle have, on the average, been found to insure complete mixing of the beverage constituents although the amount of agitation required for perfect mixing may vary with the character of the syrup. It has been found also that the rate of rotation of the bottles with the rotor, if above or below a relatively wide range, affects the thoroughness of the mixing also. Thus where the rotation is too slow, the syrup tends to run in a mass down the inside of a bottle as the bottle is slowly inverted as it turns with the rotor and to return to the bottom in a more or less coherent mass as the bottle moves to the upright position during the second half of the rotative cycle. If the rotation is too rapid, centrifugal force tends to throw the heavy syrup to the top of the bottle and retain it in that position. From 10 to 12 revolutions of the rotor per minute appears to provide the most satisfactory results where a six cell rotor is employed but a lower rate of turning is required in larger machines having more cells, such as the machines shown in the drawings where twelve cells are shown. Th average rate of rotation for such machines for best mixing results is from 9 to 11 revolutions per minute.

During operation of the machines, filled and capped bottles from a filling and capping machine are carried to the bottle intake of the machine by a flexible conveyor 21 which, in Fig. 1 is shown supported by a sprocket 22 and a large sprocket 23 mounted on and driven by shaft 12. The filling and capping machine referred to above is not shown in the drawing as it forms no part, per se, of the present invention but may be assumed to deposit the capped bottles upon the conveyor 21 which may extend to the left a greater distance than is shown in Fig. 1, or a supplemental or intermediate conveyor may deliver the bottles from the capping machine to the conveyor 21.

Along the conveyor 21 are provided inner and outer bottle guide rails 24 and 25, the former of which terminates at its delivery end at 24a and the latter of which at its delivery end curves across the conveyor toward the end of the rotor as indicated at 25a. The curved end of the rail 25 terminates adjacent a stationary retainer plate or ring 26 which is secured to the frame of the machine adjacent the intake ends of the several cells and closes said ends except as a cell is passing a bottle entrance passage 27 provided in the retainer plate. This passage is inclined to the vertical, as hereinafter described and registers with the space between the above described ends 24a and 25a of the guide rails.

Viewing Fig. 1, it will be seen that the guide rail 25, in addition to curving inwardly toward the rotor adjacent the end 25a thereof, as described above, is likewise arcuate in side elevation adjacent said end. In other words, the rail extends to the right in Fig. 1 beyond the vertical diameter of the sprocket 23 and follows the curvature of the sprocket for a few degrees beyond the vertical diameter of the sprocket. As shown in Fig. 1, a bottle b in moving from left to right along the conveyor arrives at the cell entering position of bottle B in an inclined position since it is carried by the conveyor downwardly a few degrees beyond the vertical diameter of the sprocket 23. As a bottle approaches the position of bottle B it is thus tilted into contact with the curved end portion 25a of the rail 25 and by reason of gravity, its inertia, and the urging action imparted to the bottle at the bottom thereof by the conveyor 21, the bottle tends to roll quickly along the curved rail through the entrance passage 27 into a cell, the open end of which is in or is moving into registration with the passage. The open end of a cell, at the bottle receiving station, is in position inclined to the vertical at an angle corresponding to the angle of the longitudinal axis of bottle B, as well as to the axis of the passage 27. Hence, upon registration of a cell with the passage 27, a bottle rolling along the curved rail portion 25a under the gravitational and inertial forces imparted to it, rolls quickly into the open end of the cell. This angle of inclination of a bottle in the position of bottle B, of the open end of a cell registering with the passage and of the passage itself is about 45 degrees to the vertical, as shown in Fig. 1.

After a bottle has entered the open end of a cell and is moved out of registration with the passage 27, it is retained in the cell by the stationary plate 26 which constitutes a barrier against displacement of the bottles from said receiving ends of the cells during rotation of the rotor. As each successive cell of the rotor moves into registration with the entrance passage 27, a bottle rolls into the receiving end of the cell.

During each rotation of the rotor, each cell moves past a bottle shifting device in the form of a projection 28 secured to the plate 26 and extending into registration with slots or passages 29 provided in each cell. The shifting device 28 is stationary and has an inclined bottle contacting face 28a that engages the last-to-enter bottle in each cell as the cell sweeps into a substantially upright position, and shifts the bottle inwardly of the cell the distance determined by the particular shifting member in use. The shifted bottle causes all other bottles in the cell likewise to be shifted toward the opposite or discharge end of the cell. The most remote bottle, such as bottle C, in a filled cell thus will be discharged from the cell by the action of the shifting member 28. This shifting action occurs as each cell approaches the upright position and hence the remote bottles of the filled cells are pushed out of the respective cells successively onto a receiving conveyor 30. In passing from the discharge ends of the cells, the bottles pass through a discharge passage 31 provided in a stationary retainer plate or disc 32 which prevents displacement of the remote bottles from the cells except at the proper discharge position or station.

A flexible strap 33 that normally projects partially across the discharge opening 31 and is deflected outwardly by each discharged bottle is provided as a stabilizer for preventing the discharged bottles from overturning as they are thrust outwardly from the cells onto the receiving conveyor by the action of member 28.

The conveyor 30 receives the discharged bottles and conveys them away from the machine, as to a station where the bottles are packaged or crated for distribution. Along the sides of the conveyor 30 an inner rail 34 is provided and an outer rail 35 which retains the bottles against displacement from the conveyor. The rail 35 may be outwardly bowed adjacent the discharge passage to prevent the rebound of bottles from the rail back toward the passage and to tend to cause the successive discharged bottles to roll along the rail to the right as viewed in Fig. 4.

As indicated in Fig. 1, adjacent cells are spaced apart in a circumferential direction with reference to the rotor and for preventing bottles entering such spaces, through the passage 27, filler members 36 are provided which fill the lower portions of the spaces and act as braces for rigidifying the cells. Each of the filler members 36 is provided with a slot that registers with the slots 29 of the cells which, as stated above, accommodate the inwardly projecting bottle shifting member 28 during rotation of the rotor. For the purpose of further rigidifying the cells, filler blocks or members 37 are provided between successive cells at the discharge ends thereof as shown in Fig. 4.

The bottle shifting member 28 is attached to the stationary disc 26 by screws 28a and may be replaced by one having a greater or lesser camming action on the bottles. Thus where bottles of a greater diameter are to be run through the machine, a shifter having a corresponding longer camming surface will be used.

Where the cells are to hold six bottles, the length of the cell will be sufficient to accommodate five bottles in the portion thereof beyond the innermost end of the shifter 28. The space between the entrance end of a cell and the remote end of the shifter will normally be greater than a bottle diameter except possibly that of the largest diameter bottle that the machine will accommodate. The action of the shifter, however, is to cam the last-to-enter bottle away from the entrance end of its cell and thus expel the most remote bottle in the cell and provide space at the entrance end of the cell for the next bottle that enters the cell through the passage 27. Hence, the shifter is located a few degrees in advance of the passage 27 whereby as successive cells move into registration with the passage there will be adequate space in the cells for freely receiving the entering bottles.

Where bottles of a length substantially less than the height of the cells are to be run through the machine, each preferably will be provided with a filler 38 at the upper end to prevent excessive axial sliding movement of the bottles as they are first inverted and then moved to upright positions during each rotation. Likewise side fillers 39 may be placed in the cells where relatively small diameter bottles are to be run to prevent sliding movement of the bottles from one wall of the cell to the other during rotation of the rotor. As the bottles move along the feed conveyor 21 toward the passage 27, they pack together since the rate of linear movement of the conveyor is sufficient for that purpose. Regardless of the rate of operation of the machine, the conveyor tends to pack the bottles together for several feet back from the intake passage 27 and hence, if a bottle breaks at the filling or capping machine or is picked out of the line, the gap is filled as the succeeding bottles approach the intake 27. In other words, the conveyor slides under the bottles near the intake of the agitating machine and moves or packs the bottles one against another, thus urging the foremost bottle B of Fig. 1 to sweep across the moving conveyor and to roll, as it is tilted, into the empty receiving end of a cell as the latter moves into registration with the passage 27. All the bottles on the conveyor 21 can be fed into the machine as will be obvious except where a control device hereinafter described is used.

In starting up the machine without bottles standing in packed or contacting relation on the conveyor 21 or where spaces occur between the bottles near the intake 27 due to breakage or other trouble at the capping machine, it is desirable to interrupt the feeding of bottles into the conveyor until such gap is closed by the action of the conveyor to prevent jamming of the machine such as might occur should a bottle at position B of Fig. 1 begin to roll into a cell after the same has moved slightly beyond the angular position at which the bottle should begin to move into the cell. Such delay in feeding movement of a bottle might cause the bottle to jam between the following edge of the cell and the forward edge of the passageway 27. For the purpose of avoiding such jamming action, the control mechanism shown in Fig. 7 is provided.

In Fig. 7, parts of the bottle handling mechanism are illustrated in conjunction with the control means for the purpose of making clear the functioning of the latter. In the figure, a gate 40 is shown which consists of a rod or bar connected to the plunger 41 of solenoid 42 and is reciprocable thereby. The gate is shown extending across the passage 27 at a height to obstruct movement of bottles through the passage when the gate is in the position shown. Energization of the solenoid withdraws the gate (to the right) to permit bottles to move through the passage as above described. The gate 40 is provided with a member 43, which is shown in the form of a roller extending into the rotary path of a striker 44 carried by a portion of the rotor, as by one of the cells 20. During each rotation of the striker, it contacts the roller and moves the gate a short distance to the right against the action of the solenoid plunger spring whenever the gate is in the closed position shown.

The solenoid is energized whenever two contact switches 45 and 46 are closed. Switch 45 is self-closing while switch 46 is self-opening. Switch 45 is adapted to be opened by a spring pressed bell-crank lever 47 which has one arm 47a arranged to extend over the conveyor 21 into the path of the bottles. The lever is located a short distance, such as 9 to 12 inches from the passage 27 and is retained in the position shown in Fig. 7 by bottles b upon the carrier whenever the latter are in packed or contacting relation on the carrier adjacent the bottle inlet passage 27, as shown. The relation of the operative condition of the control device to the mixing machine shown in the drawing is such as occurs shortly after the delivery of bottles to the mixer has begun at the beginning of a work period or shortly after the resumption of normal delivery of bottles to the mixer following automatic interruption of the mixer by the control means due to such irregularity of delivery of bottles by the carrier 21 that the spring 48 can swing the arm 47a of the lever 47 over the carrier (due to absence of bottles therein, and thus cause the lever arm 47b to engage the contact arm 45a of the switch 45 to break the circuit of the solenoid and permit the spring thereof to move the gate to the position shown. When, however, following the closing of the gate 40, the bottles accumulate in closely contacting relation on the carrier adjacent the intake and for a distance along the carrier such that the arm 47a is moved to the position illustrated in full lines, the switch 45 will be closed by the resilience of the arm 45a thereof. The circuit of the solenoid will still be open, however, by reason of the self-opening switch 46. When the switch 45 has been closed by the bottles on the carrier as just described, the solenoid circuit will be closed whenever the striker 44 engages the roller 43 and slides the gate 40 to the right a short distance, as ¼ to ½ inch. Such movement of the gate causes a cam 49 on the gate to close the switch 46 thus closing the solenoid circuit and effecting the full withdrawal of the gate to permit bottles to move in succession from the conveyor 21 through the passage 27 into successive cells. The cam 49 is sufficiently extended to retain the switch 46 in closed relation when the plunger of the solenoid has been fully retracted. The failure of delivery of bottles thereafter to the carrier at such rate as to retain the arm 47a in the full line position shown, however, will cause the switch 45 to open the circuit of the solenoid and thus again effect closure of the gate and interrupt the feeding of bottles to the rotor.

The positional relationship of the striker 44 with respect to the roller 43 is such that whenever the gate is closed and the switch 45 also is closed, the gate will be opened by closure of the switch 46 only when one of the cells 20 (not necessarily the cell carrying the striker 44 as shown) is in or so approaches registration with the bottle feed passage 27 that the bottle B can move fully into the vacant end of the registering cell and thus avoid being jammed between the following rear edge of the cell and the forward edge of the passage 27. The striker 44 or the roller 43 preferably is adjustable to enable synchronization of the opening of the gate with the proper angular position of one of the cells for avoiding the jamming action referred to above. For illustration, the roller 43 is shown adjustably mounted on the gate by means of a set screw 43a.

It will be seen that movement of the gate 40 to fully open position by the solenoid moves the roller 43 out of the path of the striker 44 so that repeated engagement of the two members occurs only when the gate is closed and the rotor is in operation.

The discharge of bottles in succession from the radially arranged cells as the same move into the upright position provides a space at the intake end of each cell that enables a rolling, tilting bottle at the receiving station to move freely into the cell as the cell moves into registration with the passage 27. The loading and unloading of the cells progressively is thus effected relatively smoothly and enables the machine to be operated at a relatively high speed commensurate with the proper agitation of the bottle contents to insure adequate mixing of the beverage components. As described above, a bottle on the carrier 21 as it approaches the passage 27 is tilted against the curved bottle deflector or guide 25a and begins to roll on its bottom edge along the member 25 to the passage 27 and normally merely rolls into the aligned cell by the gravitational action and the movement imparted thereto by the moving conveyor 21. It will be seen, therefore, that the bottle feeding means comprising the curved inclined member 25a in cooperation with the subjacent portion of the bottle carrying flight of the conveyor 21 causes the bottles to tilt and roll into the intake passage 27 and thus avoids the use of means for positively engaging the bottles and moving them into the cells.

While we have shown and described for illustrative purposes a preferred form of mixing machine, it will be apparent that various changes in the details of the disclosed mechanism may be resorted to without departure from the spirit of the invention or the appended claims.

We claim:

1. A machine for mixing the components of a bottled beverage comprising a rotor operable on a horizontal axis and provided on the periphery with a plurality of radially arranged open-ended cells adapted to hold a plurality of bottles in juxtaposed relation and into one end of each of which bottles are fed and from the other ends of which bottles are discharged, a stationary retaining member adjacent the bottle intake ends of the cells for preventing displacement of bottles from said intake ends during rotation of the rotor and provided with a feed passage axially aligned with a radius of the rotor and disposed for registration with the intake ends of successive cells during rotation of the rotor, bottle feeding means arranged to effect movement of bottles in succession through said passage and into succeeding cells during registration thereof with said passage, a second stationary retainer member disposed adjacent the other ends of the cells and provided with a vertical discharge passage with which the cells move successively into registration during rotation of the rotor, conveyor means for delivering bottles in single file in upright position to said feeding means, a conveyor for receiving bottles discharged through said discharge passage, and a stationary bottle shifting means for effecting the shifting of all the bottles in each cell at a common position of rotation of the cells toward the discharge ends thereof for providing spaces in the other ends of the cells for incoming bottles and effecting the discharge of one bottle from each filled cell through said discharge passage during each rotation of the rotor.

2. A machine for mixing the components of a bottled beverage comprising a rotor operable on a horizontal axis and provided on the periphery with a plurality of radially arranged open-ended cells adapted to hold a plurality of bottles in juxtaposed relation and into one end of each of which cells the bottles are fed and from the other ends of which cells the bottles are discharged, a stationary retaining member adjacent the bottle intake ends of the cells for preventing displacement of bottles from said intake ends during rotation of the rotor and provided with a feed passage axially aligned with a radius of the rotor and disposed for registration wtih the intake ends of successive cells during rotation of the rotor, bottle feeding means arranged to effect movement of bottles in succession through said passage and into succeeding cells during registration thereof with said passage, a second stationary retainer member disposed adjacent the other ends of the cells and provided with a vertical discharge passage with which the cells move successively into registration during rotation of the rotor, conveyor means for delivering bottles in single file in upright position to said feeding means, a conveyor for receiving bottles discharged through said discharge passage, and bottle shifting means arranged to project inwardly from the intake ends of the cells as the same move to the upright position for effecting the shifting of all the bottles in each cell toward the discharge ends thereof for providing spaces in the cells for incoming bottles and effecting the discharge of one bottle from each filled cell through said discharge passage during each rotation of the rotor.

3. A machine for mixing the components of a bottled beverage by rotation of the bottles about a horizontal axis comprising a rotor mounted on a horizontal axis, means for rotating the rotor, said rotor being provided with a plurality of radially disposed open-ended cells disposed longitudinally of the rotor on the periphery thereof for receiving bottles at one end and discharging bottles at the other end of each cell and each adapted to hold a plurality of bottles in juxtaposed relation, means for feeding bottles in succession into the receiving ends of successive cells as the same move into a given position of inclination rotatively beyond the upright position, the opposed walls of the bottle receiving ends of each cell being slotted inwardly for accommodating in succession a stationary bottle shifting member; and a stationary bottle shifting member disposed rotatively in advance of said inclined bottle receiving position of the cells and arranged to project into the rotative path of said slots for engaging successively the last received bottles of the cells for shifting all the bottles in the respective cells toward the discharge ends of the cells to provide unobstructed spaces in the receiving ends of the cells for accommodating bottles from said feeding means as the respective cells move into said inclined bottle receiving position and for effecting the discharge from the discharge ends of the cells when fully loaded of the first received bottle therein.

4. A machine for mixing the components of a bottled beverage by rotation of the bottles about a horizontal axis comprising a rotor mounted on a horizontal axis, means for rotating the rotor, said rotor being provided with a plurality of radially disposed open-ended cells disposed longitudinally of the rotor on the periphery thereof for receiving bottles at one end and holding the same in juxtaposed relation and enabling bottles to be discharged at the other end of each cell, means for feeding bottles in succession into the receiving ends of successive cells as the same move into a given position of inclination rotatively beyond the upright position, the opposed walls of the bottle receiving ends of each cell being slotted inwardly for accommodating in succession a stationary bottle shifting member, and a stationary bottle shifting member disposed rotatively in advance of said inclined bottle receiving position of the cells and arranged to project into the rotative path of said slots as the respective cells move into said upright position for engaging successively the last received bottles of the cells for shifting such bottles and bottles previously received by the cells toward the discharge ends of the cells to provide unobstructed spaces in the receiving ends of the cells for accommodating bottles from said feeding means as the respective cells move into said inclined bottle receiving position and for effecting the discharge from the discharge ends of the cells when fully loaded of the first received bottle therein.

5. A machine for mixing the components of a bottled beverage by rotation of the bottles about a horizontal axis with the bottles disposed radially with respect to the axis, comprising a rotor mounted on a horizontal axis and provided on the periphery with a plurality of radially disposed cells extending longitudinal of the rotor, said cells having open bottle receiving and discharge ends, an endless delivery conveyor extending along one end of the rotor for delivering bottles in juxtaposed and upright position to a bottle deflecting position, a sprocket over which the bottle carrying flight of the conveyor passes, feed means for deflecting bottles from the conveyor comprising an inclined bottle deflecting guide extending across said flight of the conveyor at a position beyond the crest of the sprocket and against which successive bottles on the flight are tilted as the bottles are moved in succession by the conveyor beyond the crest of the sprocket, said guide being arranged to cause the tilted bottles to assume a position parallel with the receiving ends of the cells and to move into the same as the cells move successively into a given bottle receiving position, and means located rotatively in advance of said bottle receiving position for successively shifting all the bottles in each cell toward the discharge end thereof upon each rotation of the rotor for providing an unobstructed space at the receiving end of each cell for accommodating another bottle to be delivered thereto by said deflecting means and for discharging from the respective cell when filled the bottle at the discharge end thereof.

STANLEY A. DOMACK.
JOHN RUTKOWSKI.

REFERENCES CITED

The following references are of record in the file of this patent:

UNITED STATES PATENTS

| Number | Name | Date |
|---|---|---|
| 1,355,032 | Brown | Oct. 5, 1920 |
| 2,043,621 | Judd | June 9, 1936 |
| 2,265,803 | Davis | Dec. 9, 1941 |